(12) United States Patent
Sassa

(10) Patent No.: US 7,623,781 B1
(45) Date of Patent: Nov. 24, 2009

(54) IMAGE SHOOTING APPARATUS

(75) Inventor: Masayuki Sassa, Tokyo (JP)

(73) Assignee: Mega Vision Corporation, Chiyoda-ku, Tokyo (JP)

( * ) Notice: Subject to any disclaimer, the term of this patent is extended or adjusted under 35 U.S.C. 154(b) by 397 days.

(21) Appl. No.: 10/591,717

(22) PCT Filed: Mar. 4, 2005

(86) PCT No.: PCT/JP2005/003771
§ 371 (c)(1),
(2), (4) Date: Sep. 5, 2006

(87) PCT Pub. No.: WO2005/085949
PCT Pub. Date: Sep. 15, 2005

(30) Foreign Application Priority Data
Mar. 5, 2004 (JP) .............................. 2004-062075

(51) Int. Cl.
*G03B 41/00* (2006.01)
(52) U.S. Cl. ............................ 396/322; 352/70; 348/36
(58) Field of Classification Search ................... 396/72, 396/333, 324, 325; 352/70
See application file for complete search history.

(56) References Cited

U.S. PATENT DOCUMENTS

| 2,828,664 | A | * | 4/1958 | Hoch | .......................... | 396/386 |
| 2,896,503 | A | * | 7/1959 | Smith | .......................... | 352/70 |
| 5,581,314 | A | * | 12/1996 | Yoneyama et al. | .......... | 396/331 |
| 5,727,242 | A | * | 3/1998 | Lo et al. | ...................... | 396/324 |

(Continued)

FOREIGN PATENT DOCUMENTS

GB 2 354 388 3/2001

(Continued)

OTHER PUBLICATIONS

Report on Research, Development, and Demonstrating Regarding New Video (HighDefinition Video and the Like), Research, Development and Demonstration Experiment of Ultra Large Screen Video System; Fiscal 1999; Japan Keirin Association Sponsored Project (Machine Field); Mar. 2000; Development Committee of the High-Tech Visual Promotion Center (HVC) with English Translation of pp. 20-22 and 28-40.

(Continued)

*Primary Examiner*—W B Perkey
*Assistant Examiner*—Noam Reisner
(74) *Attorney, Agent, or Firm*—Alston & Bird LLP

(57) ABSTRACT

An image pickup device capable of dividing an image into two or three portions and capturing the image portions as divided. The image pickup device comprises a splitting part (135), which includes both a bi-prism for splitting an incident light into two and a tri-prism for splitting an incident light into three, and an exchange mechanism for exchanging the bi-prism and tri-prism. The splitting part (135) can be located other than a position where the focus position of a main lens (131), on which a light from a subject (140) is incident, coincides with the focus positions of relay lenses (132,133, 134) that guide the split lights. This arrangement allows images of normal, twice or three times wide, which are equivalent to images as acquired by a single, two or three cameras, respectively, to be captured, recorded, reproduced, relayed, transmitted, displayed, or screened.

4 Claims, 17 Drawing Sheets

U.S. PATENT DOCUMENTS

| | | | |
|---|---|---|---|
| 5,937,212 A * | 8/1999 | Kurahashi et al. | 396/20 |
| 6,349,153 B1 | 2/2002 | Teo | |
| 6,674,581 B2 | 1/2004 | Miyano | |
| 2003/0133019 A1 | 7/2003 | Higurashi et al. | |
| 2005/0206754 A1 | 9/2005 | Sassa | |

FOREIGN PATENT DOCUMENTS

| | | |
|---|---|---|
| JP | 58-76807 | 5/1983 |
| JP | 60-250789 | 12/1985 |
| JP | 4-97334 | 3/1992 |
| JP | 9-101476 | 4/1997 |
| JP | 9-197582 | 7/1997 |
| JP | 9-258350 | 10/1997 |
| JP | 10-32741 | 2/1998 |
| JP | 11239356 | 8/1999 |
| JP | 2001 333314 | 11/2001 |
| JP | 2003 107346 | 4/2003 |
| JP | 2003 270520 | 9/2003 |
| JP | 2004-240153 | 8/2004 |

OTHER PUBLICATIONS

Report on Research, Development and DemonstrationRegarding New Video, Development and Verification Directed to Commercialization of Ultra Large Screen Video System; Fiscal 2000 Japan Keirin Association Sponsored Project (Machine Field); Mar. 2001; Development Committee of the High-Tech Visual Promotion Center (HVC) with English Translation of pp. 46-53.

Report on Investigation/Research Project Regarding New Video, Investigation and Study Regarding Improvement of Seams of Ultra Large Screen Video System; Fiscal 2001 Japan Keirin Association Sponsored Project (Machine Field); Mar. 2002; Digital Content Association of Japan with English Translation of pp. 28-42.

The International Search Report for PCT/JP2005/003771; Filed Mar. 4, 2005; Date of Completion Mar. 25, 2005; Date of Mailing Apr. 12, 2005.

The Notice of Reason for Rejection (English Translation included).

* cited by examiner

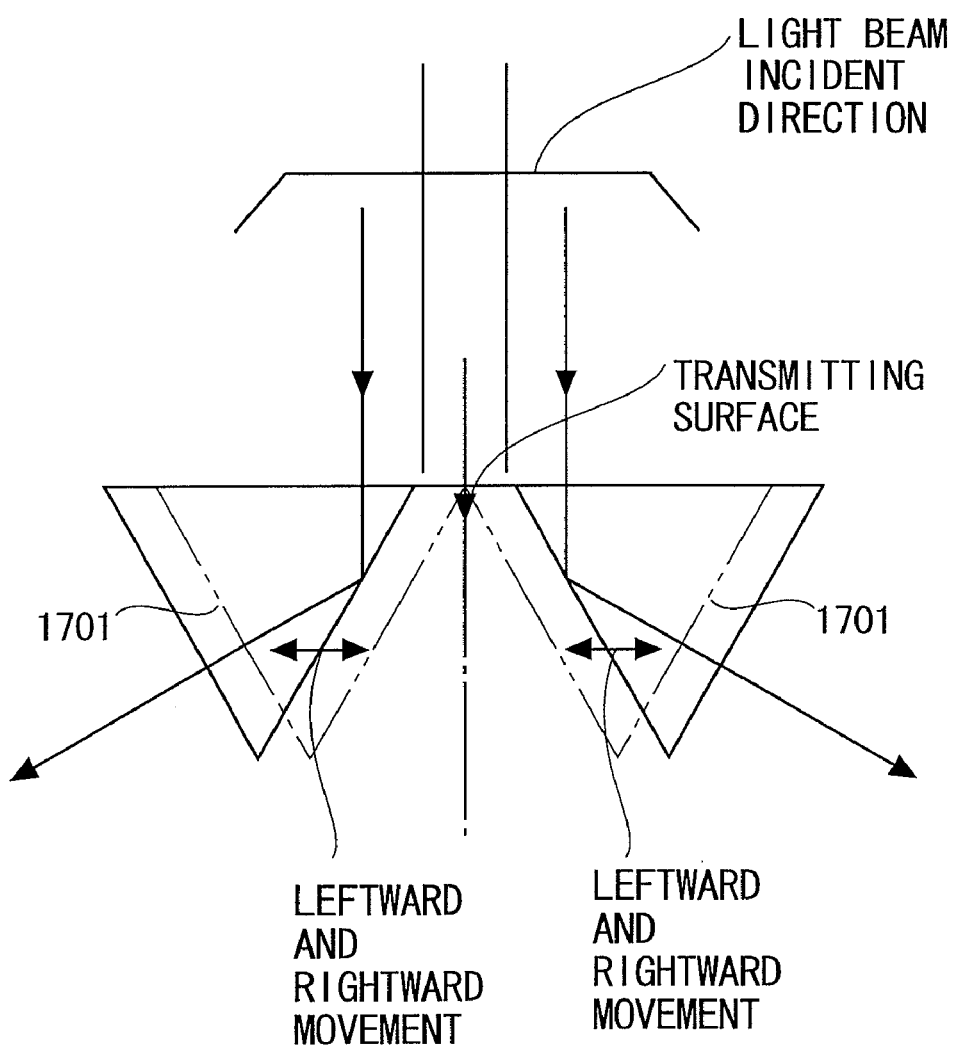

IMAGE SHOOTING APPARATUS

TECHNICAL FIELD

The present invention relates an image shooting apparatus.

BACKGROUND OF THE INVENTION

Conventional image shooting apparatus split one video image for capture (for example, refer to Non-Patent document 1, Non-Patent document 2, and Non-Patent document 3, below). Further, optically overlapped video image generation processing is known as a process performed to improve the seams of the split and captured video images when stitching the video images together at the overlap (for example, refer to Non-Patent document 4, Non-Patent document 5, and Non-Patent document 6).

[Non-Patent document 1] "Report on Research, Development, and Demonstration Regarding New Video (Hi-Vision, High-Definition Video, and the Like), Master Concept for Ultra Large Screen Video System, by Fiscal 1998 Japan Keirin Association Sponsored Project (Machine Field)", pp. 27-34, March 1999, Development Committee of The High-tech Visual Promotion Center (HVC).

[Non-Patent document 2] "Report on Feasibility Study Regarding Development of Ultra Large Screen Video Capturing System for Events", pp. 15-23, March 2000, The Mechanical Social Systems Foundation, Consignee: The High-tech Visual Promotion Center.

[Non-Patent document 3] "Report on Feasibility Study Regarding Development of Ultra Large Screen Video Capturing System for Events", p. 35, June 2001, The Mechanical Social Systems Foundation, Consignee: Digital Content Association of Japan (The Former High-tech Visual Promotion Center (HVC)).

[Non-Patent document 4] "Report on Research, Development, and Demonstration Regarding New Video (High-Definition Video and the Like), Research, Development and Demonstration Experiment of Ultra Large Screen Video System, by Fiscal 1999 Japan Keirin Association Sponsored Project (Machine Field)", pp. 20-63, March 2000, Development Committee of The High-tech Visual Promotion Center (HVC).

[Non-Patent document 5] "Report on Research, Development, and Demonstration Regarding New Video, Development and Verification Directed to Commercialization of Ultra Large Screen Video System, by Fiscal 2000 Japan Keirin Association Sponsored Project (Machine Field)", pp. 46-54, March 2000, Development Committee of The High-tech Visual Promotion Center (HVC).

[Non-Patent document 6] "Report on Investigation/Research Project Regarding New Video, Investigation and Study Regarding Improvement of Seams on Ultra Large Screen Video System, by Fiscal 2001 Japan Keirin Association Sponsored Project (Machine Field)," pp. 28-42, March 2002, Digital Content Association of Japan.

DISCLOSURE OF THE INVENTION

Problem to be Solved by the Invention

However, in the conventional video systems, it is difficult to realize both processing of splitting a video image into three portions for capture and processing of splitting a video image into two portions for capture by a single device.

An object of the present invention is to provide a video system capable of splitting the video image into two or three portions and of capturing the video image as split by a single device.

Means for Solving the Problem

An image shooting apparatus according to the present invention includes:

bi-splitting means for splitting incident light into two, which can be located at a position other than a position where a focal position of a main lens on which light from an object to be image-captured is incident coincides with a focal position of a relay lens which guides split light;

tri-splitting means for splitting incident light into three, which can be located at a position other than the position where the focal position of the main lens on which light from the object to be image-captured is incident coincides with the focal position of the relay lens which guides split light; and exchange means for exchanging between the bi-splitting means and tri-splitting means.

In addition, in a video system according to the present invention, the relay lens includes a focus lens group which includes a convex lens group having at least one convex lens and a concave lens group having at least one concave lens, wherein at least one of the convex lens group and the concave lens group in the focus lens group is moved to perform an adjustment in which an optical path length of each of two split light is made equal to an optical path length of each of three split light.

In addition, a video system according to the present invention further includes reflecting means for reflecting light outputted from the bi-splitting means and the tri-splitting means, wherein the reflecting means is mechanically moved to perform an adjustment in which an optical path length of each of two split light is made equal to an optical path length of each of three split light.

In addition, the image shooting apparatus according to the present invention further includes adjusting means for performing an adjustment in which an optical path length of each of two split light is made equal to an optical path length of each of three split light, the adjusting means being inserted on an optical path between the main lens and the camera.

EFFECTS OF THE INVENTION

As described above, the present invention includes a bi-splitting means for splitting light into two and a tri-splitting means for splitting light into three. The present invention further includes exchange means for exchanging between the bi-splitting means and the tri-splitting means.

Therefore, according to the present invention, two or three divisional video images can be captured by a single image shooting apparatus. Further, for example, when a video image of the three divisional video images at a position is used, a one-screen video image which is not split can be captured.

According to the present invention, an image of normal, twice, or three-time wide, which corresponds to a lateral width of a single, two, or three cameras, can be captured, recorded/reproduced, relayed/transmitted, or displayed/screened.

According to the present invention, the exchange between the bi-splitting means and the tri-splitting means is performed by the exchange means. Therefore, when the exchange between the bi-splitting means and the tri-splitting means is performed, an adjustment procedure of the bi-splitting means and the tri-splitting means in the image shooting apparatus can be significantly reduced.

According to the present invention, the bi-splitting means and the tri-splitting means can be located at a position other than a position where the focal position of the main lens on which light from the object to be image-captured is incident coincides with the focal position of the relay lens which guides split light.

Therefore, according to the present invention, it is possible to perform optically overlapped video image generation processing of generating a video image overlapped with both divisional video images. A deterioration of a seam which is caused by the bi-splitting means and the tri-splitting means can be prevented by the optically overlapped video image generation processing.

According to the present invention, the adjustment in which the optical path length of each of the two split light is made equal to the optical path length of each of the three split light is performed by the movement of the convex lens group and the concave lens group which compose the focus lens group, the movement of the reflecting means, or the insertion of the adjusting means. Therefore, even when the exchange between the bi-splitting means and the tri-splitting means is performed and thus a variation in optical path length occurs, it is suitably adaptable. Here, the optical path length is a product of a length L of a path on which light travels and a refractive index n of a medium along the path in the case of the medium having the refractive index n.

BRIEF DESCRIPTION OF THE DRAWINGS

FIG. 17 is a schematic view showing a regular triangular prism type splitting unit which can be used for the video system shown in FIG. 1.

DESCRIPTION OF REFERENCE NUMERALS

Figure 1:
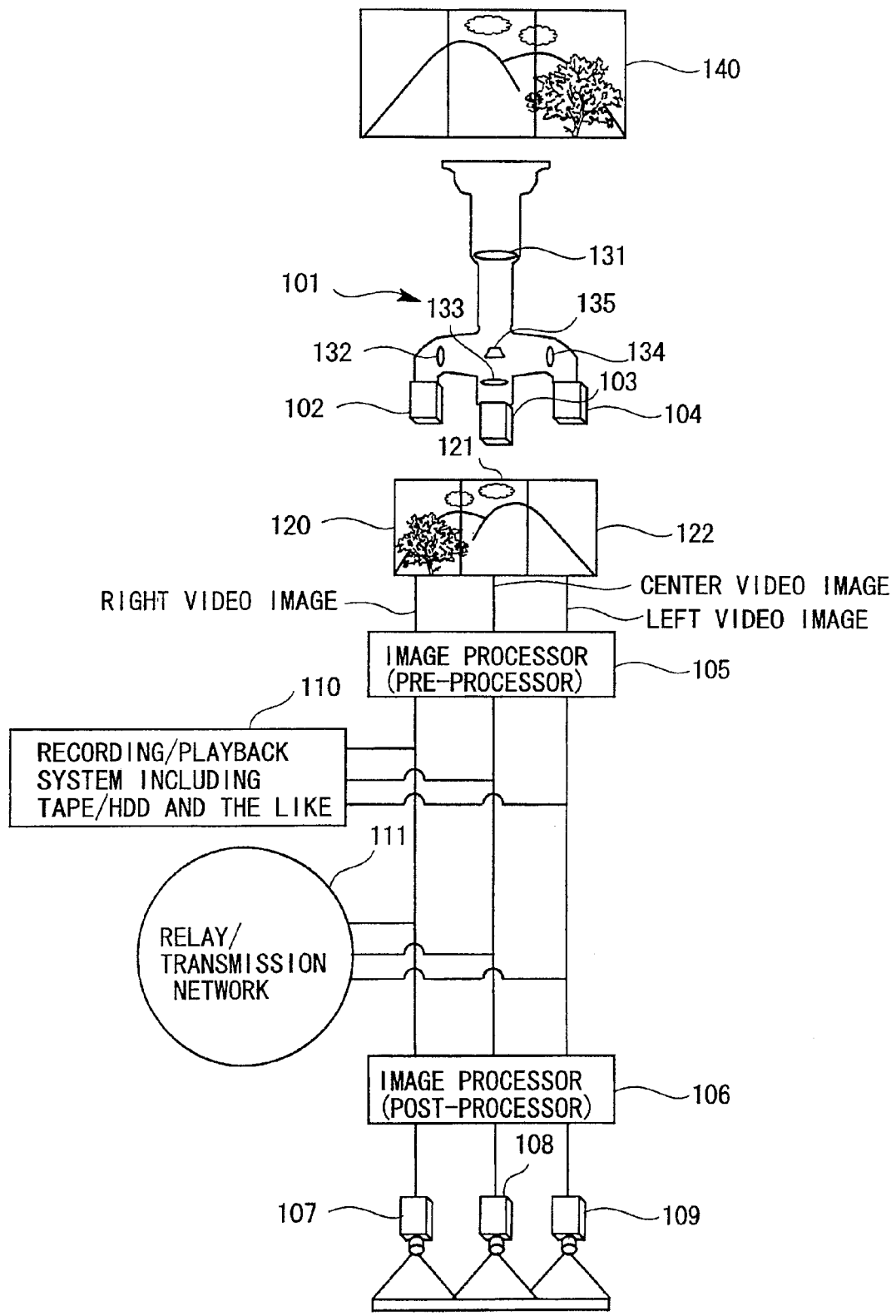
FIG. 1 is a diagram showing the entire configuration of the video system using the image shooting apparatus according to an embodiment of the present invention.

101 lens unit
102,103,104 camera
105,106 image processor
107,108,109 display system
110 Recording/playback system
111 Relay/transmission network
120 Video data of right portion of object
121 Video data of center portion of object
122 Video data of left portion of object
131 Main lens
132,133,134 Relay lens
135 Splitting unit
140 Object
301 Bi-splitting prism
304,305 Reflecting surface
306,307 Reflecting mirror
401 Tri-splitting prism
405 Reflecting surface
406 Transmitting surface
407 Reflecting surface
801 Mount base
802 Pillars
803 Moving plate
804 Gear
805 Knob
806 Shaft
1401, 1402, 1501, 1502 Optical path length adjusting members
1601 Reflecting mirrors
1701 Regular triangular prisms

BEST MODE FOR CARRYING OUT THE INVENTION

A best mode for carrying out the present invention will be described below with reference to the drawings. The configuration of the following embodiment is an illustration, and the present invention is not limited to the configuration of the embodiment.

<Entire Configuration>

First, the entire configuration of the video system using the image shooting apparatus according to one embodiment of the present invention will be described with reference to FIG. 1. FIG. 1 is a diagram showing the entire configuration of the video system using the image shooting apparatus according to the one embodiment of the present invention. Note that FIG. 1 is a diagram showing the video system as viewed from above (bird's eye view).

As shown in FIG. 1, the video system using the image shooting apparatus according to the one embodiment of the present invention includes a lens unit 101, cameras 102, 103, and 104, image processors 105 and 106, and display systems 107, 108, and 109. It is not necessary to make the number of those display systems 107, 108, and 109 coincide with the number of cameras, and the number of the display systems 107, 108, and 109 may be an arbitrary number. Further, the lens unit 101 corresponds to one example of a part of the image shooting apparatus of the present invention.

The image processor 105 is also called a pre-processor. The image processor 106 is also called a post-processor.

Further, a recording/playback system 110 and a relay/transmission network 111 are connectable to the video system shown in FIG. 1. Further, when the recording/playback system 110 and the relay/transmission network 111 are not connected to the video system, a local live broadcast is performed, for example.

The following description will be made by taking as an example the case where a video image is split into three. However, this embodiment is also applicable to the case where the video image is split into two.

<Lens Unit 101>

First, the lens unit 101 will be described. The lens unit 101 is composed of the main lens 131 onto which light from an object to be image-captured (herein after called the "object") 140 is made incident, a splitting unit 135 which splits light from the main lens 131, and relay lenses 132, 133, and 134 onto which light of video images split by the splitting unit 135 is made incident. Note that, though each of the main lens 131 and the relay lenses 132, 133, and 134 is illustrated as one lens in FIG. 1, actually, each of them is a combination of at least one or more lenses.

The main lens 131 can form a wide video image of video images captured by the three cameras into an image without any distortion. The relay lenses 132, 133, and 134 guide the split light to cameras 102, 103, and 104.

The splitting unit 135 is composed of a bi-splitting prism which splits the incident light into two, and a tri-splitting prism which splits the incident light into three.

Further, a video image of the right portion of the object 140 reaches the left relay lens 132 viewed from above (bird's eye view) the video system. Similarly, a video image of the center portion of the object 140 is and reaches the center relay lens 133 viewed from above (bird's eye view) the video system, and a video image of a left portion of the object 140 is and reaches the right relay lens 134 viewed from above (bird's eye view) the video system.

Figure 2:
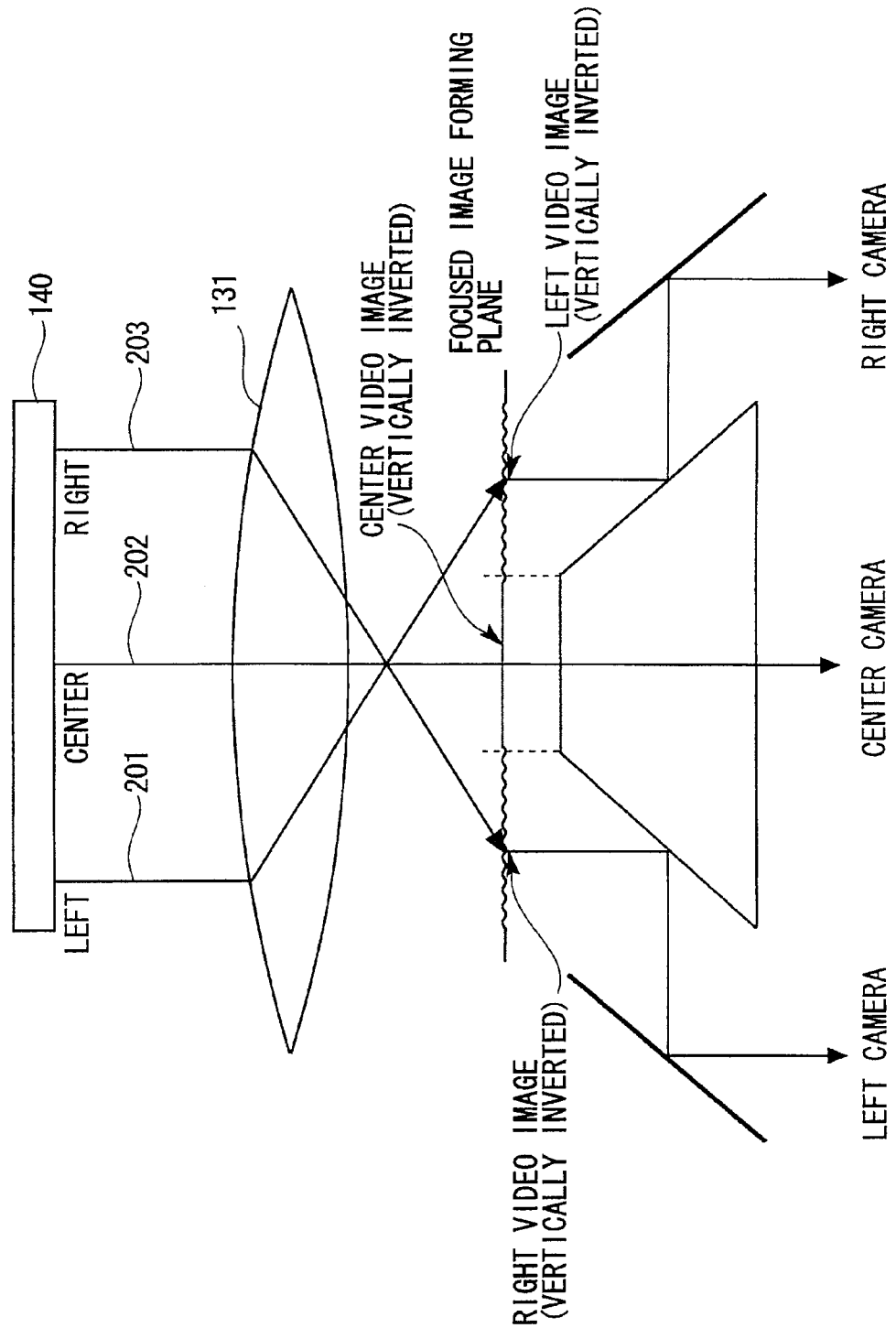
FIG. 2 is a conceptual diagram showing part of optical paths in the video system shown in FIG. 1.

Further, as shown in FIG. 2, the left-portion light 201 output from the object 140 is refracted and formed into an image by the main lens 131, and then refracted and formed into an image one more time through the relay lens. Accordingly, the light for the left video image, which is made incident onto the right camera, becomes an upright one. Further, the light for the left video image is horizontally inverted by the reflecting surface of the prism, and accordingly, horizontally inverted by a mirror. FIG. 2 is a conceptual view partially showing optical paths in the video system shown in FIG. 1.

Further, the center-portion light 202 output from the object 140 is refracted and formed into an image by the main lens 131, and then refracted and formed into an image one more time through the relay lens. Accordingly, the light for the center video image, which is made incident onto the center camera, becomes an upright one.

As shown in FIG. 2, the right-portion light 203 output from the object 140 is refracted and formed into an image by the main lens 131, and then refracted and formed into an image one more time by the relay lens. Accordingly, the light for the right video image, which is made incident onto the left camera, becomes an upright one. Moreover, this light for the right video image is horizontally inverted by the reflecting surface of the prism, and accordingly, horizontally inverted by a mirror.

The cameras 102, 103, and 104 convert the incident light into video data as digital data. The cameras 102, 103, and 104 may be commercially available cameras or cameras developed exclusively for the video system shown in FIG. 1. Any cameras are usable as long as they conform to the existing broadcast standard.

Further, gamma processing in line with the broadcast standard is performed on the video data output by the cameras 102, 103, and 104.

Further, video images in which the object 140 is upright is incident onto the cameras 102, 103, and 104. Accordingly, the cameras 102, 103, and 104 are set so as to be vertically inverted.

Hence, the camera 102 outputs video data 120 of the right portion of the object 140, the camera 103 outputs video data 121 of the center portion of the object 140, and the camera 104 outputs video data 122 of the left portion of the object 140.

<Bi-Splitting Prism>

Figure 3:
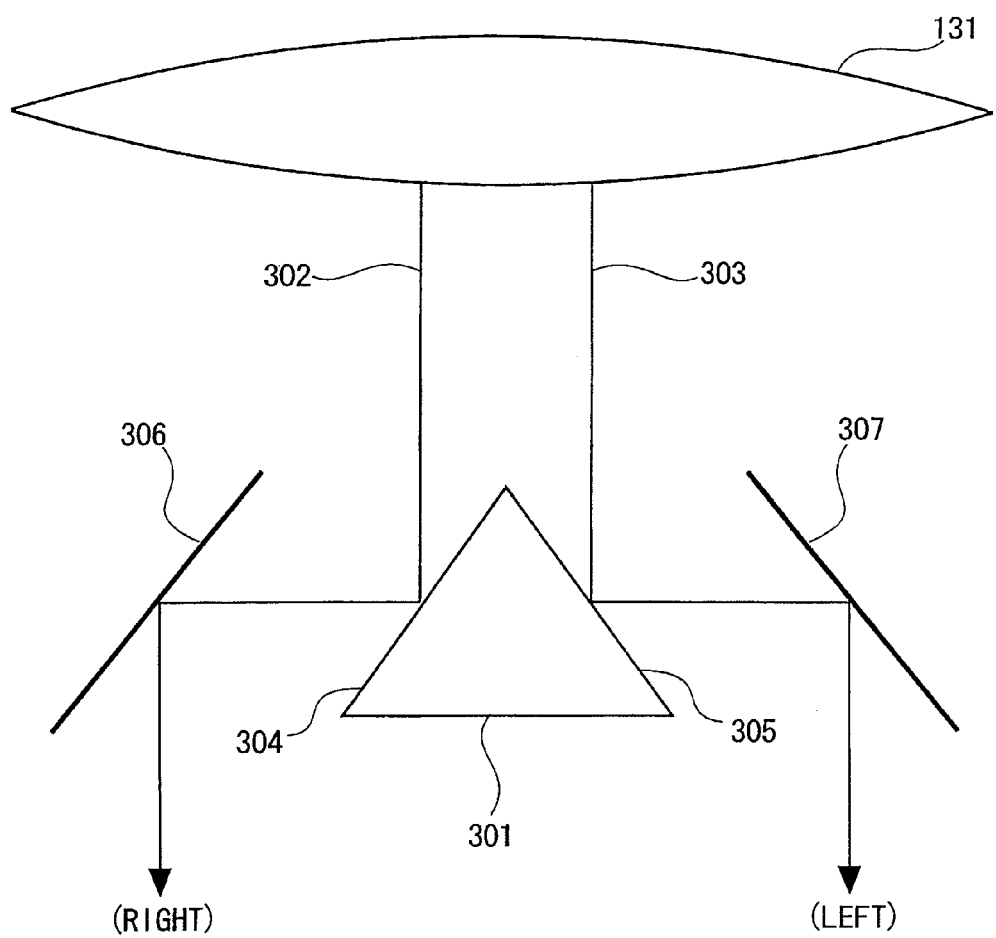
FIG. 3 is a schematic diagram of the bi-splitting prism for use in the video system shown in FIG. 1.

Next, the bi-splitting prism for use in the video system shown in FIG. 1 will be described with reference to FIG. 3, which is a schematic diagram of the bi-splitting prism for use in the video system shown in FIG. 1.

The bi-splitting prism 301 includes a reflecting surface 304 and a reflecting surface 305. As shown in FIG. 2, light 302 and light 303 from the main lens 131 are made incident onto the bi-splitting prism 301.

The light 302 output from the main lens 131 is reflected by the reflecting surface 304. The light 302 reflected by the reflecting surface 304 is reflected by the reflecting mirror 306. The light 302 reflected by the reflecting mirror 306 becomes the light for the right video image.

The light 303 output from the main lens 131 is reflected by the reflecting surface 305. The light 303 reflected by the reflecting surface 305 is reflected by the reflecting mirror 307. The light 303 reflected by the reflecting mirror 307 becomes the light for the left video image.

<Tri-Splitting Prism>

Figure 4:
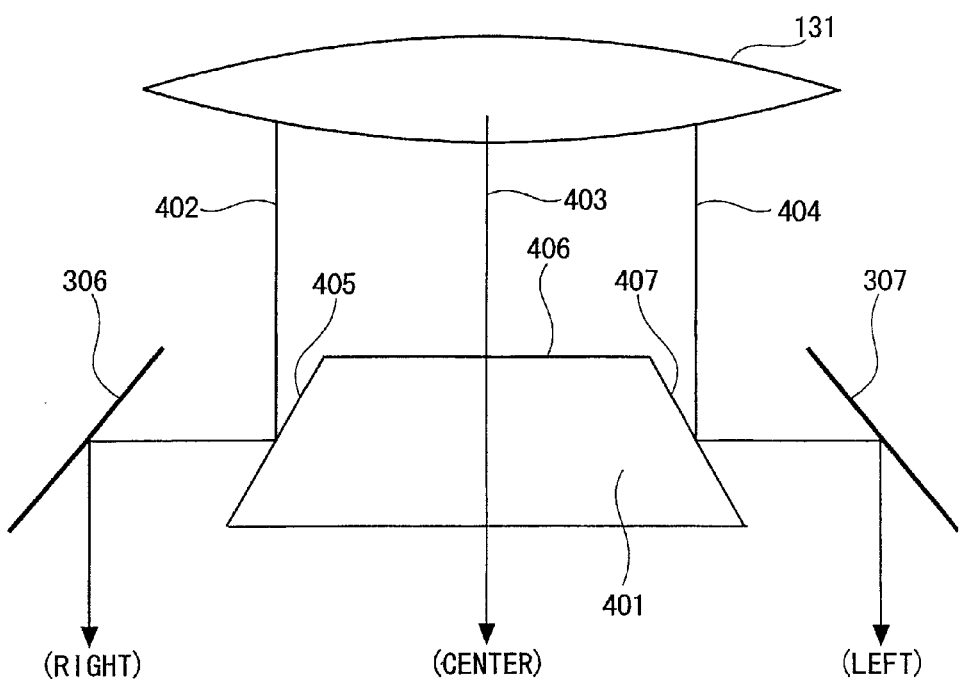
FIG. 4 is a schematic diagram of the tri-splitting prism for use in the video system shown in FIG. 1.

Next, the tri-splitting prism for use in the video system shown in FIG. 1 will be described with reference to FIG. 4. FIG. 4 is a schematic diagram of the tri-splitting prism for use in the video system shown in FIG. 1.

The tri-splitting prism 401 includes a reflecting surface 405, a transmitting surface 406, and a reflecting surface 407. As shown in FIG. 4, light 402, light 403, and light 404 from the main lens 131 are made incident onto the tri-splitting prism 401.

The light 402 output from the main lens 131 is reflected by the reflecting surface 405. The light 402 reflected by the reflecting surface 405 is reflected by the reflecting mirror 306. The light 402 reflected by the reflecting mirror 306 becomes the light for the right video image.

The light 403 output from the main lens 131 is transmitted through the transmitting surface 406. The light 403 having transmitted through the transmitting surface 406 becomes the light for the center image.

The light 404 output from the main lens 131 is reflected by the reflecting surface 407. The light 404 reflected by the reflecting surface 407 is reflected by the reflecting mirror 307.

The light 404 reflected by the reflecting mirror 307 becomes the light for the left video image.

The bi-splitting prism 301 and the tri-splitting prism 401 are exchanged for each other according to needs.

<Optically Overlapped Video Image Generation Processing>

The lens unit 101 of the embodiment can perform optically overlapped video image generation. The optically overlapped video image generation processing will be described below.

First, the splitting unit 135 includes the bi-splitting prism. Then, in the case of the bi-splitting prism, light incident onto an edge thereof is sometimes reflected to a direction other than a direction toward the camera. Because of this reflection, the light incident onto the edge portion of the bi-splitting prism is sometimes not made incident onto the camera.

Furthermore, in the lens unit 101, there is a position where the focal plane of the main lens 131 and focal planes of the relay lenses 132, 133, and 134 coincide with one another. Here, the focal planes are planes formed of the respective focal points of the main lens and the relay lenses.

When the bi-splitting prism is set at this position, undesirably, the main lens and the relay lenses are brought into focus also on the edges of the bi-splitting prism.

Accordingly, when the video image is recorded on a CCD of the camera, a portion of the light which is not made incident onto the camera is recognized as a dropout or line of the image by the camera. Therefore, the portion recognized as the dropout or the line becomes a one to several-dot dropout of the image.

Further, the splitting unit 135 includes the tri-splitting prism. In the case of forming reflecting surfaces (left and right) and a transmitting surface (center) on the tri-splitting prism, physical defects relating to formation of surface coatings in the tri-splitting prism occur on the edges thereof.

Furthermore, in the lens unit 101, there is a position where the focal plane of the main lens 131 and the focal planes of the relay lenses 132, 133, and 134 coincide with one another. When the tri-splitting prism is set at this position, undesirably, the main lens and the relay lenses are brought into focus also on the edges of the tri-splitting prism.

Accordingly, when the video image is recorded on the CCD of the camera, the defects on the edges are recognized as dropouts or lines of the video image by the camera. Therefore, the portions recognized as the dropouts or the lines become one to several-dot dropouts of the image.

In the video system of the embodiment, in order to cope with such dropouts of the video image as described above, which occur in the bi-splitting prism and the tri-splitting prism, a function to shift the position of the splitting unit 135 from the focal plane position in the lens unit 101 where the focal plane of the main lens 131 and the focal planes of the relay lenses 132, 133, and 134 coincide with one another is provided. Further, this function can be made valid/invalid.

By this shift, the edges of the bi-splitting prism and the tri-splitting prism, which cause the video dropouts, turn into a state of not being brought into focus, that is, into a blurred state. Then, the physical video dropouts on the edges of the tri-splitting prism due to the formation of the surface coatings and the video dropout on the edge of the bi-splitting prism due to the reflection become out of the focus. As a result of this, it becomes impossible to visually observe these video dropouts. Specifically, these dropouts are not captured as apparent pixel dropouts (improper white balance) in the camera.

Furthermore, by this shift, diffraction of the light occurs. By this diffraction of the light, certain regions on both left and right sides of the splitting line become gradually darker (weaker), and an optically overlapped video image is generated. The optically overlapped video image is generated uniformly on both horizontal ends of the split video image. Generation of this overlapped video image is referred to as optically overlapped video image generation processing in this specification.

The overlapped video image is also referred to as an optical overlap in the present invention. Further, the generation of the overlapped video image is referred to as optical overlap processing. The size of this overlapped video image is increased and decreased according to a shift amount of the splitting unit 135 from the focal plane. By use of the overlapped video image, the video system of the embodiment performs the video processing in the image processor 105 at the latter stage. By the video processing, the video system of the embodiment can eliminate partial dropout of the video image (can make the video image seamless), which occurs by the prism edges or the bi-splitting/tri-splitting means, the dropout being the problem to be solved.

Figure 5:
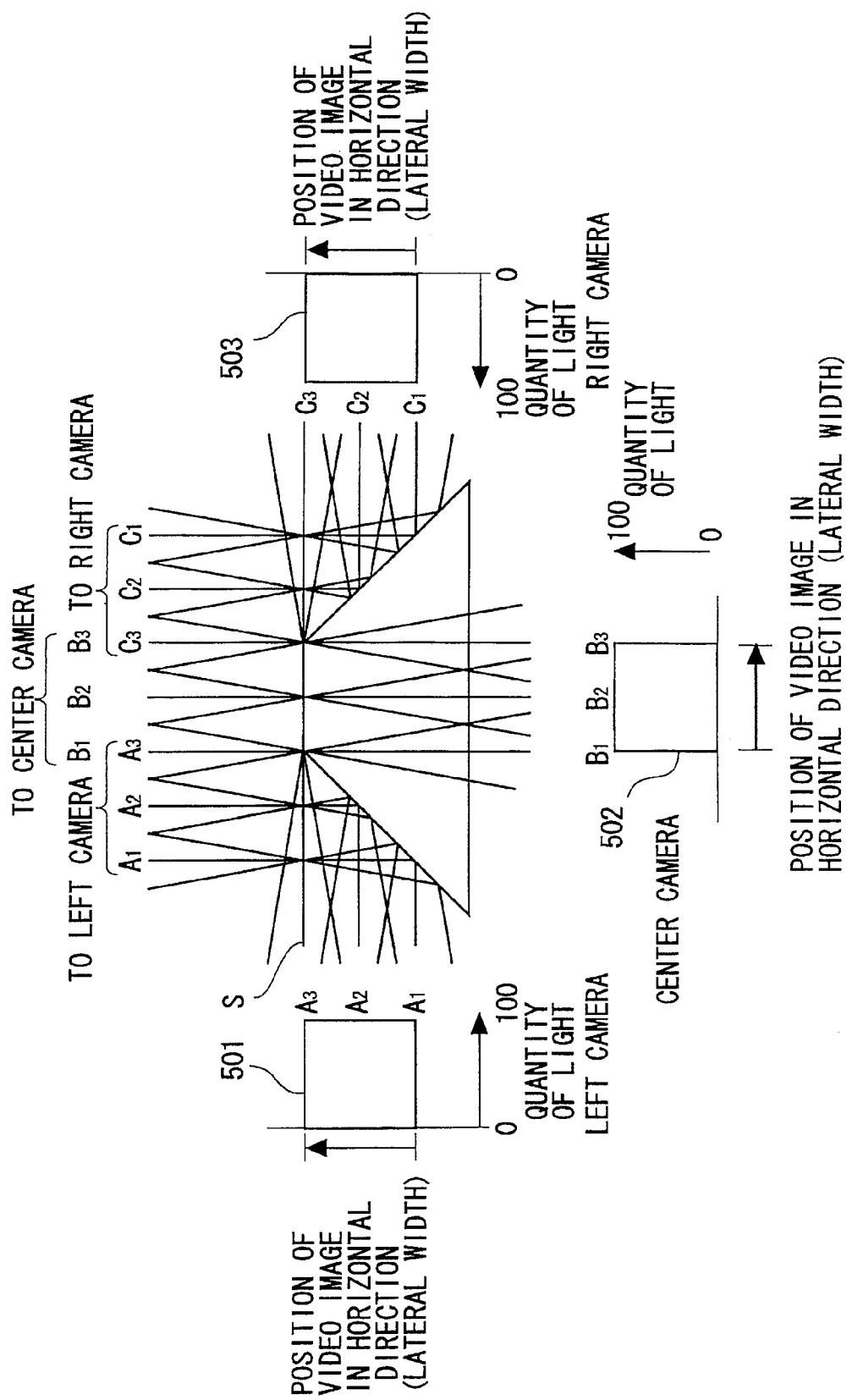
FIG. 5 is a schematic diagram showing a case where the upper surface of the tri-splitting prism is placed on the focal plane of the main lens.
Figure 6:
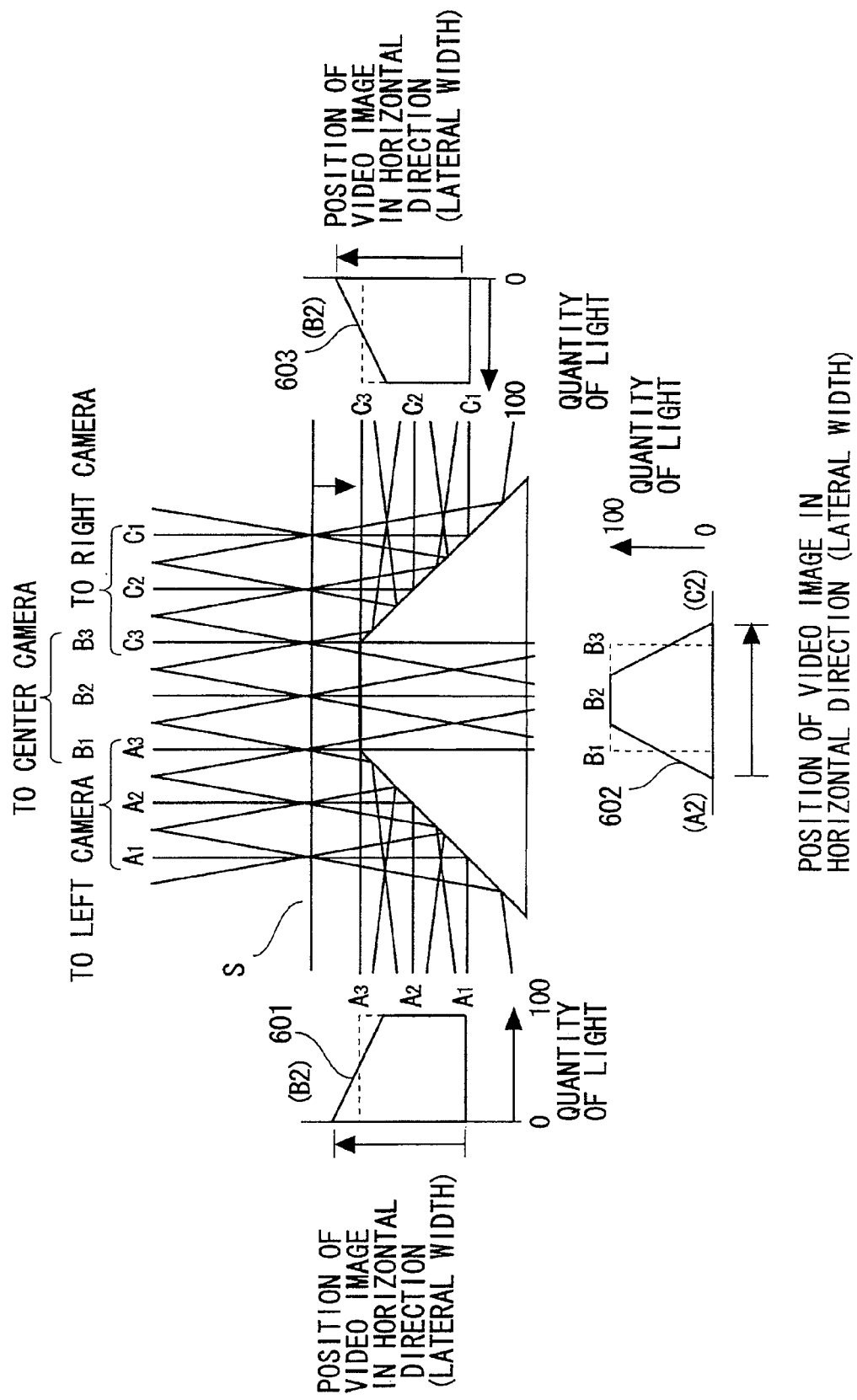
FIG. 6 is a schematic diagram showing a case where the upper surface of the tri-splitting prism is located below the focal plane of the main lens.
Figure 7:
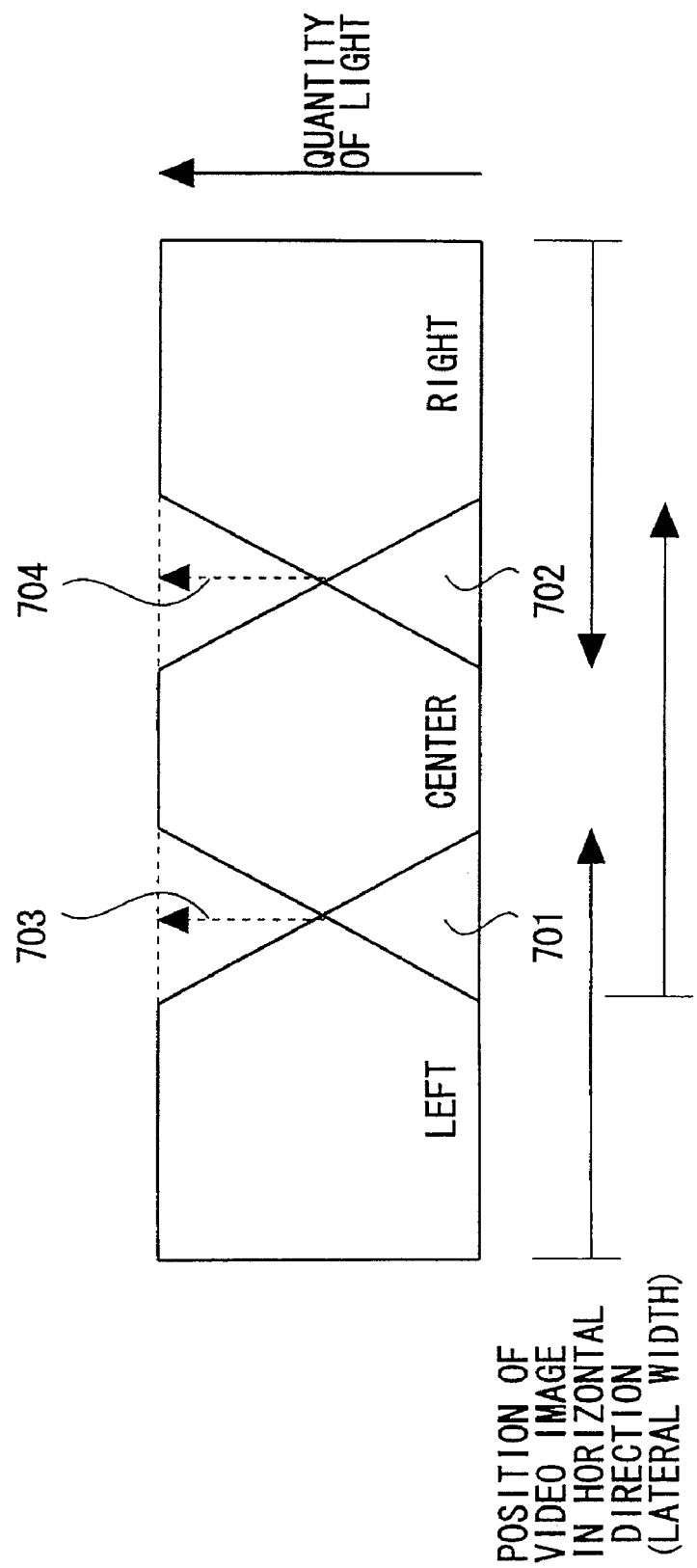
FIG. 7 is a conceptual diagram showing a state where video images incident onto the left camera, center camera, and right camera are synthesized in the case shown in FIG. 6.

This optically overlapped video image generation processing will be described below in further detail with reference to FIGS. 5, 6 and 7. FIG. 5 is a schematic diagram when the upper surface of the tri-splitting prism is set on the focal plane of the main lens. FIG. 6 is a schematic diagram when the upper surface of the tri-splitting prism is shifted backward from the focal plane of the main lens. FIG. 7 is a conceptual diagram showing a state where video images made incident onto the left camera, the center camera and the right camera are synthesized in the case shown in FIG. 6. In the following description, the optically overlapped video image generation processing by means of the tri-splitting prism will be described; however, even in the case of the bi-splitting prism, substantially the same description may be made.

First, as shown in graphs 501, 502 and 503 of FIG. 5, when the upper surface of the tri-splitting prism is set on the focal plane S of the main lens, quantities of light incident onto the left camera, the center camera and the right camera ideally become substantially rectangular. The case shown in FIG. 5 is a case where the optically overlapped video image is not generated. Further, the graph 501 is a graph showing the quantity of light incident onto the left camera. Further, the graph 502 is a graph showing the quantity of light incident onto the center camera. Further, the graph 503 is a graph showing the quantity of light incident onto the right camera. Furthermore, in each of the graphs 501, 502 and 503, a direction perpendicular to an increasing direction of the quantity of light indicates a position of the video image in the horizontal direction (lateral width).

However, in the case shown in FIG. 5, the video image incident onto the center camera is not incident onto the left camera, and neither the video image of the left camera nor the video image of the right camera is incident onto the center camera. Hence, when there is a burr or the like on image splitting portions of the tri-splitting prism (portions onto which light A3 and light C3 are incident), there will be a partial lack of the video image. The tri-splitting prism is processed with so high precision that this partial lack of the video image occurs due to a mere disturbance of the transmitting/reflecting surfaces.

Next, the case shown in FIG. 6 is a case where the focal plane S of the main lens is set apart from the front surface of the tri-splitting prism. In this case, as shown in graphs 601, 602 and 603, for example, quantities of light incident onto the respective cameras are gradually decreased as ranges of the video images go toward their horizontal ends. Further, for example, as shown in graph 603, a part of the video image incident onto the center camera is also incident onto the right camera. Here, the graph 601 is a graph showing the quantity of light incident onto the left camera. Further, the graph 602 is a graph showing the quantity of light incident onto the center camera. Further, the graph 603 is a graph showing the quantity of light incident onto the right camera. Furthermore, in each of the graphs 601, 602 and 603, a direction perpendicular to an increasing direction of the quantity of light indicates a position of the video image in the horizontal direction (lateral width).

Then, when the video images of the left camera, the center camera and the right camera are synthesized in a state shown in FIG. 6, a state as shown in FIG. 7 appears. Note that, though an actual overlapped video image is generated as a band with a uniform width, the example shown in FIG. 7 shows that this band becomes darker as it goes to the left as shown in the graph of the quantity of light. Further, in the graph shown in FIG. 7, a direction perpendicular to an increasing direction of the quantity of light indicates positions of the video images in the horizontal direction (lateral width).

As shown in FIG. 7, in the video images incident onto the respective cameras, video image portions 701 and 702 to be captured on the other cameras will be included though their quantities of light are small. When these portions are synthesized, pixels can be tightly matched, and no pixel dropout occurs. Further, in FIG. 7, synthesized portions 703 and 704 mean that adding up the portions 701 and 702 optically leads to the same quantities of light as those of portions other than the optically overlapped video images. The above is the optically overlapped video image generation processing in the video system of the embodiment.

<Image Processor 105>

Next, the image processor 105 shown in FIG. 1 will be described. The image processor 105 generates single video data from the video data output from the cameras 102, 103, and 104.

The image processor 105 performs seamless processing for the overlapped video image generated in the lens unit 101. The seamless processing will be described later. Then, the image processor 105 splits the generated single video data one more time according to the number of cameras, and then outputs the split data.

Note that, in the video system shown in FIG. 1, consideration is also made of the case where the processing in the image processor 105 is not required, and the processing such as the seamless processing of the image processor 105 may be set to ON or OFF. Specifically, this case is a case where the optical overlap is not attached and where the partial lack of pixels is tolerated.

<Seamless Processing>

Next, the seamless processing performed in the image processor 105 will be described. The image processor 105 performs inverse gamma processing for the received video data. The inverse gamma processing is a process which is inverse to the gamma processing performed on the video data in the cameras 102, 103, and 104. Specifically, the inverse gamma processing is processing for releasing the gamma processing performed in the cameras 102, 103, and 104 for the video data output therefrom, and returning the received video data for which the gamma processing has been performed by the cameras to the video data before the gamma processing has been performed thereon at the time of being output by the cameras.

Next, the image processor 105 synthesizes the pieces of video data of the same optically overlapped video images, which are adjacent to each other, and on which the inverse gamma processing has been performed. Then, the image processor 105 optically adds (synthesizes) brightness of the pieces of video data to become uniform with brightness of video data which is not synthesized. The portions synthesized in such a manner are portions of the overlapped (duplicate overlap) video images generated by the optically overlapped video image generation.

Next, the image processor performs the gamma processing for the synthesized video data, and returns the video data to the state where the gamma processing is performed thereon in a similar way to the output data of the cameras.

By the above-described processing, the image processor 105 generates video data of a one-screen ultra wide video image without noise or pixel dropout, which is the same as the video image on the main lens, on the image processor 105 on-board memory.

It is necessary to perform this processing of the image processor 105, at the time of capturing the video image, prior to the recording of the video data, the transmission or direct display of the video data. Further, the image processor 105 stores the video data in the memory with a landscape video image captured by the three cameras in the horizontal direction taken as a reference format.

Further, after the seamless processing, the image processor 105 splits the video data into the same number of data as the number of cameras which have captured the video data, and then outputs the split video data. Note that, the split of the data is not performed in the case of capturing a video image.

Further, based on a switch provided in the image processor 105 or a command (processing bit) included in the video signal, for the received video data, the image processor 105 switches itself to any of processing for an "unsplit" video image, processing for video images split into two, and processing for video images split into three. The processing for performing the switching of the splitting processing for the video here based on the command (processing bit) included in the video signal will be described later.

The reason why the image processor 105 outputs the same number of video data as the number of cameras is because the output of the same number of video data as the number of cameras makes it easy to realize compatibility of the video system of this embodiment with the existing video recording system, transmission/relay system, playback/display system, and the like.

Here, description will be made regarding where the control information for allowing the image processor 105 to perform the optically overlapped video image generation processing according to the split number of received video images is to be set on the video data output from the cameras 102, 103, and 104.

In this embodiment, control information for the video pattern to be processed is set on user data regions in HD (High-Definition)-SDI (Serial Data Interface) streams output from the cameras 102, 103, and 104. In order to give priority to compatibility with conventional video, for the video pattern to be processed, nothing is set in the case of no splitting, and for example, values of "MV2" and "MV3" are set in the case of bi-splitting and tri-splitting to enable identification. Here, such predetermined values as MV2 and MV3 are set for the purpose of preventing a malfunction of the image processor. Naturally, these values may be combinations of other characters.

In this case, the location where the control information is set on "Material Transmission Ancillary Data (General Information)" ($574^{th}$ line) defined by "ARIB TR-B22."

ARIB stands for "Association of Radio Industries and Businesses," and "TR-B22" is a standard number thereof. However, the object of the video system shown in FIG. 1 is not limited to Hi-Vision (HDTV), and accordingly, the above-described standard is a mere example.

<Image Processor 106>

Next, operation of the image processor 106 will be described. In order to reproduce the video image captured by the lens unit 101 on a large screen as it is, it is necessary to consider compatibility with the existing display system. Of existing display systems, a typical display system is a projector. In the video system of the embodiment, as an example, three pieces of video data are stitched together in the lateral direction, and are displayed.

Therefore, the video system of the embodiment uses three projectors as display devices. Further, in the case of splitting a video into two in capturing the video, two projectors are used as the display devices. Further, in the case of using only one of the video images split into three, one projector is used as the display device.

Meanwhile, in the case of stitching together video images by using three projectors, in some cases, a completely seamless video cannot be reproduced. This is due to geometrical distortions of individual projection lenses of the three projectors and a difference in tone, brightness, electrical characteristics, and the like among the instruments. When the three video images are simply joined together without solving these problems, a gap or a duplicated portion occurs in the seam, or the three video images will have tones clearly different from one another. Accordingly, the video images can hardly be recognized as one seamless video.

Accordingly, in the video system in which the image shooting apparatus of this embodiment is used, in order to avoid these problems, electrically overlapped video image generation processing for seam processing is performed in the image processor 106.

This electrically overlapped video image generation processing is processing which generates the duplicated portion of the video image data by splitting the video image into two adjacent images and imparting the video image data of the overlapped portion of one of the adjacent images to the overlapped portion of the other video data.

The portion of the duplicated video imparted by this electrically overlapped video image generation processing is projected while being synthesized by the projectors with the overlapped portions of the adjacent images fitted.

The quantity of light of the portion projected while being synthesized by the projectors will be doubled. Therefore, in this embodiment, the image processor 106 performs cross-fade processing for reducing the quantity of light with respect to the quantity of light of the portion in which the quantity of light is doubled. Thus, the image processor 106 adjusts the quantity of light, thus obtaining uniform brightness. By this processing, in this embodiment, preprocessing to display a smooth and seamless video image is realized.

The above-described electrically overlapped video image generation processing and cross-fade processing are performed for improving screening quality of the seam upon display for the purpose of adapting to the display device used. Therefore, in some cases, even if the electrically overlapped video image is not imparted, a seamless display can be properly made by joining and displaying the received video images for correct display.

As described above, in some cases, it is not necessary to perform the electrically overlapped video image generation processing and the cross-fade processing. Therefore, in the video system shown in FIG. 1, the image processor 106 makes it possible to turn ON or OFF the above-described electrically overlapped video image generation processing and cross-fade processing.

Here, description will be made regarding where the control information with which the image processor 106 performs the electrically overlapped video image generation processing according to a received video pattern is to be set on the video data output from the cameras 102, 103, and 104.

Based on a switch provided in the image processor 106 or a command (processing bit) included in the video signal, for the received video, the image processor 106 switches whether to perform processing for an "unsplit" video image, to perform processing for video images split into two, or to perform processing for video images split into three. Here, based on the command (processing bit) included in the video signal, the image processor 106 performs the switching of the splitting processing for the video.

In a way similar to the case of the above-mentioned image processor 105, in this embodiment, the image processor 106 sets control information for the video pattern to be processed on user data regions in the HD-SDI streams output from the cameras 102, 103, and 104, (In order to give priority to compatibility with conventional video, nothing is set in the case of no splitting, and for example, values of "MV2" and "MV3" are set in the case of bi-splitting and tri-splitting to enable identification). Here, such predetermined values as MV2 and MV3 are set is for the purpose of preventing a malfunction of the image processor. Naturally, these values may be combinations of other characters.

In this case, the control information is set on the location of "Material Transmission Ancillary Data (Generalized Information)" ($574^{th}$ line) defined by "ARIB TR-B22." ARIB refers to "Association of Radio Industries and Businesses," and "TR-B22" is a standard number thereof.

However, the object of the video system shown in FIG. 1 is not limited to Hi-Vision (HDTV), and accordingly, the above-described standard is a mere example.

<Recording/Playback System 110>

Next, the recording/playback system 110 shown in FIG. 1 will be described. The recording/playback system 110 records a video on video channels of which number corresponds to the number of cameras, which is output from the image processor 105. Further, the recording/playback system 110 plays back the recorded video. The recording/playback system 110 includes, for example, a tape, an HDD, and the like as constituent components.

<Relay/Transmission Network 111>

Next, the relay/transmission network 111 will be described. The relay/transmission network 111 relays and transmits the video output from the image processor 105 or the recording/playback system 110 to a network.

<Display Systems 107, 108, 109>

Next, the display systems 107, 108, and 109 shown in FIG. 1 will be described. The display systems 107, 108, and 109 are composed, for example, of projectors. Naturally, the display systems 107, 108, and 109 usable in the present invention are not limited to projectors, and other display systems can also be used. These display systems are usable as long as they are commercially available display systems or dedicated display systems and conform to broadcast or PC standards.

The display systems 107, 108, and 109 display video images based on the video data output from the image processor 105, the video data output from the recording/playback system 110, and the video data output through the relay/transmission network 111. As mentioned above, when the electrically overlapped video images are imparted to the received video data, the display systems 107, 108, and 109 synthesize the portions of the electrically overlapped video images, and display the video images.

<Mechanism for Exchanging Between Bi-Splitting Prism and Tri-Splitting Prism>

Figure 8:
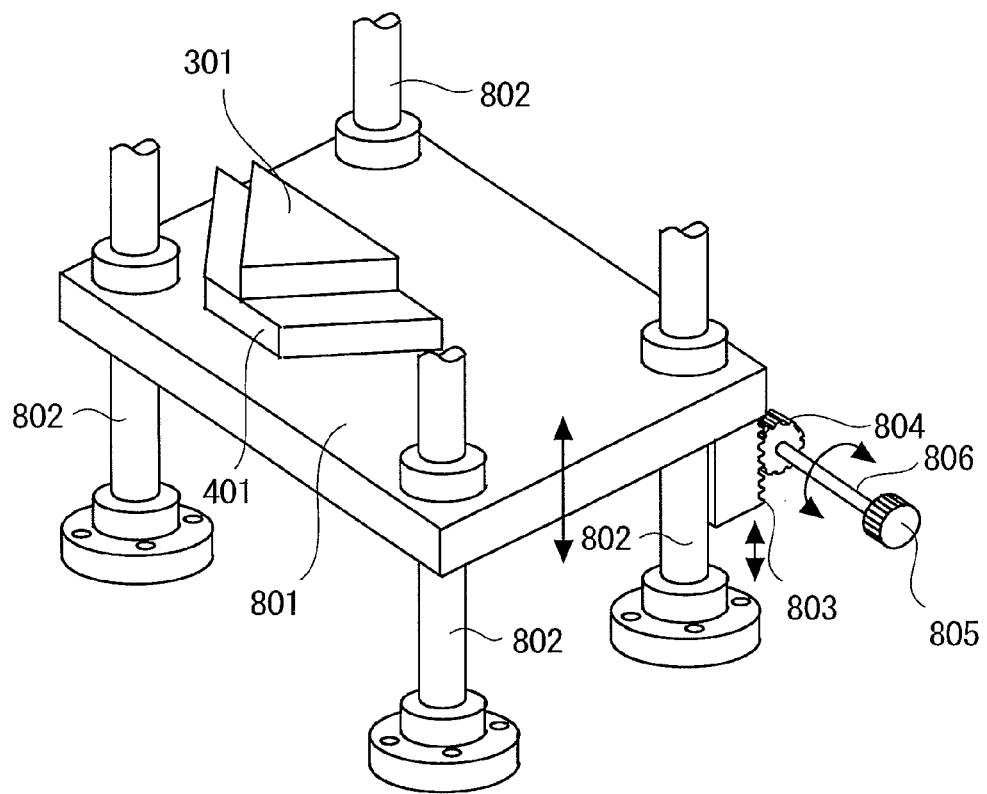
FIG. 8 is a schematic view showing a mechanism for exchanging between the bi-splitting prism and the tri-splitting prism which are used in the video system shown in FIG. 1.

Next, a mechanism for exchanging between the bi-splitting prism and the tri-splitting prism which are used in the video system shown in FIG. 1 will be described with reference to FIG. 8. FIG. 8 is a schematic view showing the mechanism for exchanging between the bi-splitting prism and the tri-splitting prism which are used in the video system shown in FIG. 1. The mechanism shown in FIG. 8 composes an example of exchange means in the present invention.

As shown in FIG. 8, the exchange mechanism in this embodiment includes a mount base 801 on which the bi-splitting prism 301 and the tri-splitting prism 401 are mounted, four pillars 802 for supporting the mount base 801, a moving plate 803 which is in contact with a bottom surface of the mount base 801 and movable upward and downward, a gear 804 rotated by engagement with the moving plate 803, a knob 805 for rotating the gear 804, and a shaft 806 for connecting the knob 805 with the gear 804.

As shown in FIG. 8, the bi-splitting prism 301 and the tri-splitting prism 401 are overlapped with each other. When the bi-splitting prism 301 and the tri-splitting prism 401 are to be bonded to each other, there may be employed a method of inserting the bi-splitting prism 301 into the tri-splitting prism 401, a method of assembling both the prisms, in each of which grooves or protrusions are formed to be concave or convex, or a method of fixing both the prisms by rods, cylinders, or the like which are inserted into several holes formed in a bonding surface between the prisms.

The bi-splitting prism 301 and the tri-splitting prism 401 are mounted on the mount base 801. The mount base 801 is movable upward and downward while it is supported by the four pillars 802. The pillars 802 are located in the four corners of the mount base 801. The pillars 802 extend through the mount base 801.

The moving plate 803 is in contact with the bottom surface of the mount base 801. The moving plate 803 is moved upward and downward by rotation of the gear 804. When the moving plate 803 moves upward, the mount base 801 is moved upward by the movement of the moving plate 803. When the moving plate 803 moves downward, the mount base 801 is moved downward by gravity. The mount base 801 and the moving plate 803 may be connected and integrated with each other. In this case, the mount base 803 is moved upward and downward by the upward and downward movement of the moving plate 803.

The gear 804 is engaged with the moving plate 803. The knob 805 is connected with the gear 804 through the shaft 806. The gear 804 is rotated in synchronization with the knob 805 through the shaft 806 by rotation of the knob 805. Then, the moving plate 803 is moved upward and downward by rotation of the gear 804.

<Exchange Between Bi-Splitting Prism and Tri-Splitting Prism>

Figure 9:
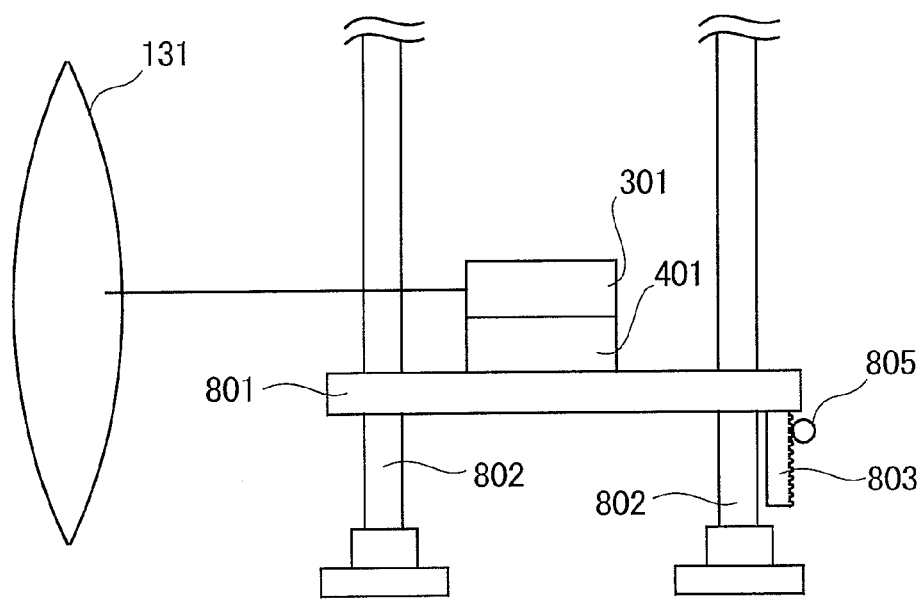
FIG. 9 is a schematic view showing an operation for exchanging between the bi-splitting prism and the tri-splitting prism in the video system shown in FIG. 1.
Figure 10:
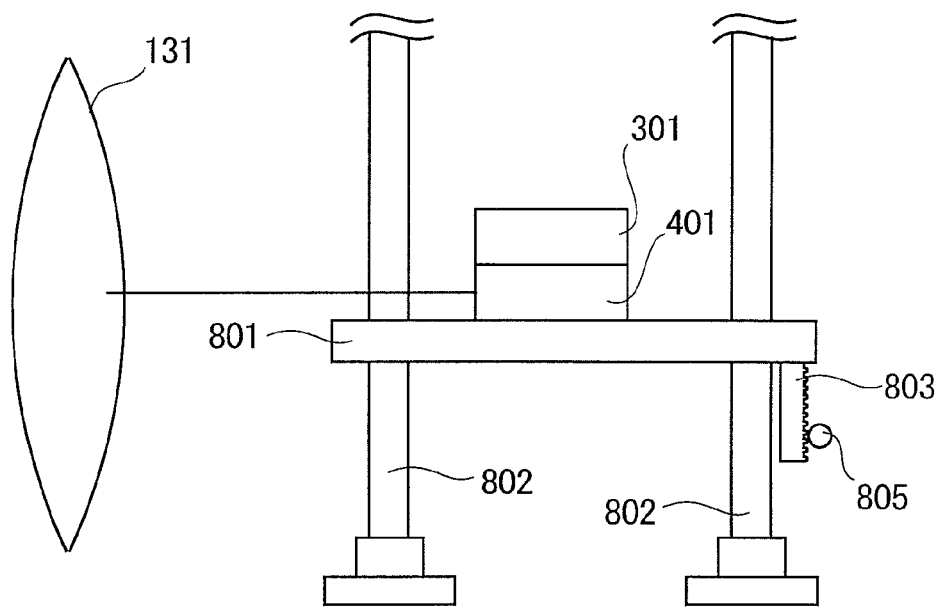
FIG. 10 is a schematic view showing an operation for exchanging between the bi-splitting prism and the tri-splitting prism in the video system shown in FIG. 1.

Next, an exchange between the bi-splitting prism and the tri-splitting prism will be described with reference to FIGS. 9 and 10. FIGS. 9 and 10 are schematic views showing an operation for exchanging between the bi-splitting prism and the tri-splitting prism in the video system shown in FIG. 1. FIG. 9 shows a case where the bi-splitting prism 301 is selected. FIG. 10 shows the case where the tri-splitting prism 401 is selected.

In this embodiment, the bi-splitting prism 301 and the tri-splitting prism 401 are overlapped and integrated with each other. In this embodiment, the structure as shown in FIGS. 9 and 10 is employed. The exchange between the bi-splitting prism 301 and the tri-splitting prism 401 is performed by the upward and downward movement of the mount base 801 which is caused by the rotation of the knob 805.

Therefore, in this embodiment, even in the case of the exchange between the bi-splitting prism 301 and the tri-splitting prism 401, it can be prevented that the positions of the bi-splitting prism 301 and the tri-splitting prism 401 relative to a box of the lens unit are changed to such an extent that the positions influence the split of light every time the exchange is performed. Note that a mode for the exchange between the bi-splitting prism and the tri-splitting prism is not limited to the case shown in FIGS. 9 and 10 and thus other modes are possible.

<Structure of Optical Path>

Figure 11:
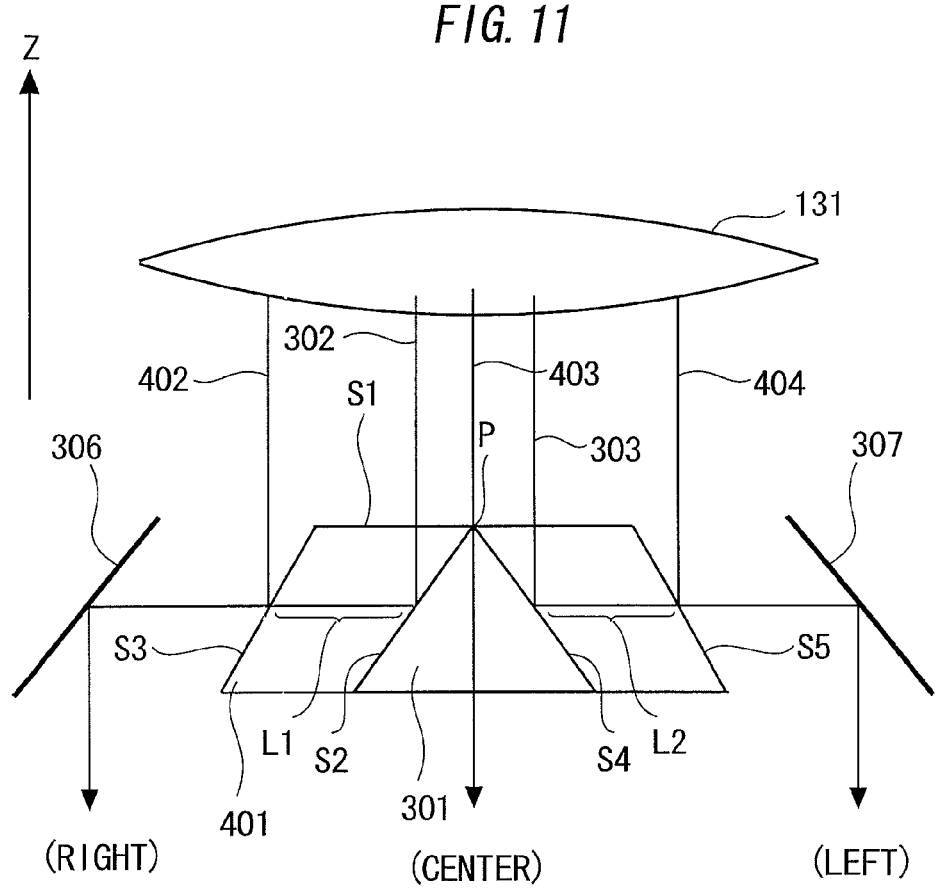
FIG. 11 is a concept view showing an optical path in the video system shown in FIG. 1.

Next, an optical path in the video system shown in FIG. 1 will be described with reference to FIG. 11. FIG. 11 is a concept view showing the optical path in the video system shown in FIG. 1. As shown in FIG. 11, the light 302 and the light 303 which are outputted from the main lens 131 are incident on the bi-splitting prism 301.

The light 402, the light 403, and the light 404, which are outputted from the main lens 131 are incident on the tri-splitting prism 401. In the video system shown in FIG. 1, the bi-splitting prism 301 and the tri-splitting prism 401 are selectively used. Therefore, as shown in FIG. 11, there is no case where the bi-splitting prism 301 and the tri-splitting prism 401 are simultaneously used. The example shown in FIG. 11 is just a concept.

A vertex P of the bi-splitting prism 301 is located in the same z-coordinate position as that of an upper surface S1 of the tri-splitting prism on the Z-coordinate axis extending to the main lens 131. Note that the z-coordinate has an axis which has a direction from the bi-splitting prism or the tri-splitting prism to the main lens 131 and is parallel to an optical path of light outputted from the main lens 131.

A side surface S2 of the bi-splitting prism 301 is parallel to a side surface S3 of the tri-splitting prism 401. According to such a structure with respect to the bi-splitting prism 301 and the tri-splitting prism 401, the light 302 and the light 402 are outputted in the same direction through a reflecting mirror 306.

A side surface S4 of the bi-splitting prism 301 is parallel to a side surface S5 of the tri-splitting prism 401. According to such a structure with respect to the bi-splitting prism 301 and the tri-splitting prism 401, the light 303 and the light 404 are outputted in the same direction through a reflecting mirror 307.

As shown in FIG. 11, a distance difference L1 between the optical path 302 and the optical path 402 corresponds to an optical path length difference between the optical path 302 and the optical path 402. A distance difference L2 between the optical path 303 and the optical path 404 corresponds to an optical path length difference between the optical path 303 and the optical path 404.

<Optical Path Length Adjustment Function>

Next, an optical path length adjustment function in the video system shown in FIG. 1 will be described with reference to FIGS. 12 to 15. As shown in earlier FIG. 11, an optical path length of light which is outputted from the main lens 131 and reaches a camera is different between a case where the bi-splitting prism is used and a case where the tri-splitting prism is used.

Therefore, according to the video system in this embodiment, the optical path length in the video system shown in FIG. 1 is adjusted using a first example, a second example, a third example, or a combination of those as described below.

First Example

Figure 12:
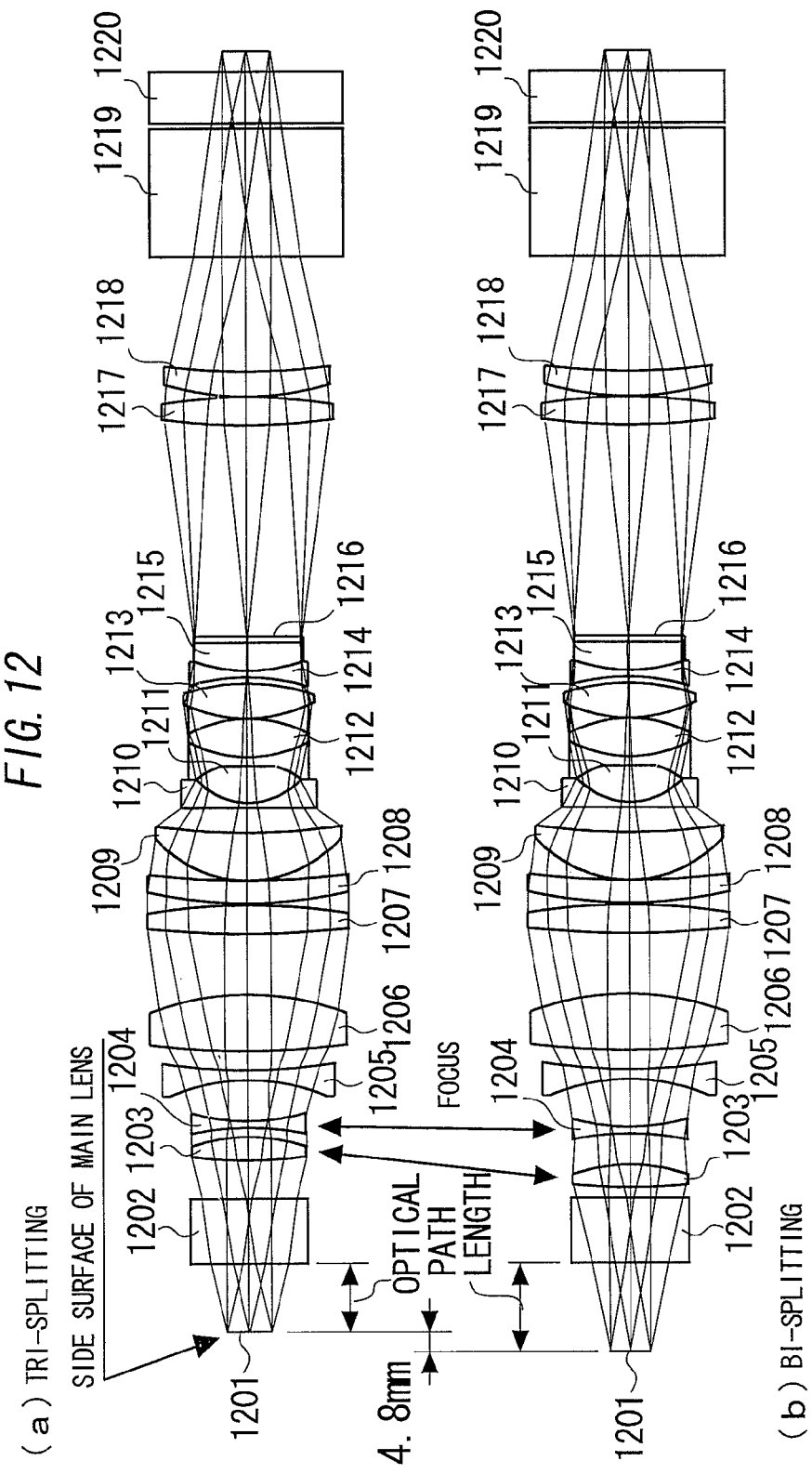
FIG. 12 are structural views each showing a relay lens for adjusting an optical path length by movement of a focus lens group, which is a first example of a function for adjusting the optical path length in the case where an exchange between the bi-splitting prism and the tri-splitting prism is performed in the video system shown in FIG. 1.

FIG. 12 are structural views each showing a relay lens for adjusting the optical path length by moving a focus lens group, which is a first example of a function for adjusting the optical path length in a case where the exchange between the bi-splitting prism and the tri-splitting prism is performed in the video system shown in FIG. 1. The focus lens group is composed of at least one of a group including at least one convex lens and a group including at least one concave lens. In the examples shown in FIG. 12, the focus lens group is composed of a lens 1203 which is a convex lens and a lens 1204 which is a concave lens.

In the examples shown in FIG. 12, FIG. 12(a) shows the case where the bi-splitting prism is used and FIG. 12(b) shows the case where the tri-splitting prism is used. In the examples shown in FIG. 12, a focal length in each of two cases, the case where the tri-splitting prism is used and the case where the bi-splitting prism is used, is adjusted while a distortion is corrected by a combination of the convex lens and the concave lens.

That is, the fact that it is adaptable to the tri-splitting prism and the bi-splitting prism means that, even when the optical path length changes, an image plane does not physically move and optical performances are preferably maintained.

In order to resolve a change in optical path length not in a mechanical manner for changing a positional relationship between the relay lens and a splitting prism but in an optical manner, it is necessary to dispose the focus lens group in front of the relay lens. The relay lens is telecentric on each of an object side and an image side. Therefore, in the case of the relay lens, when focus adjustment is to be performed in a normal manner using a single lens unit, it is difficult to correct a curvature of field. Here, "telecentric" is an optical system in which a principal ray is parallel to an optical axis. An optical system whose entrance pupil is located at infinity is an incident side telecentric optical system. An optical system whose exit pupil is located at infinity is an exit side telecentric optical system. An optical system whose entrance pupil and exit pupil each are located at infinity is a both-side telecentric optical system. The case shown in FIG. 12 corresponds to the case of the both-side telecentric optical system.

That is, when the tri-splitting is changed to the bi-splitting, the optical path length optically lengthens, so an image on the relay lens becomes blurred. With respect to a method of focusing the image on the relay lens, it is only necessary to bring the relay lens close by the lengthened optical path length. In other words, left and right relay lens units are physically extended and contracted, loaded and unloaded, or moved.

In this embodiment shown in FIG. 12, the focus lens group is divided into a convex lens group and a concave lens group. The focus lens groups are separately and suitably moved in accordance with a change in optical path length. With such a structure, in this embodiment, the optical path length can be preferably corrected. In the examples shown in FIG. 12, the focus lens group corresponds to the lens 1203 and the lens 1204. The lens 1203 is formed of a single convex lens and may be composed of a convex lens group including a plurality of convex lenses. The lens 1204 is formed of a single concave lens and may be composed of a concave lens group including a plurality of concave lenses.

Even when the focus lens group is not divided into the convex lens group and the concave lens group which are arranged in order from the left as shown in FIG. 12 but into the concave lens group and the convex lens group which are arranged in order from the left, the same effect is obtained. In the examples shown in FIG. 12, the relay lens includes a parallel plate 1202 for optical path length correction, the lens 1203, the lens 1204, a lens 1205, a lens 1206, a lens 1207, a lens 1208, a lens 1209, a lens 1210, a lens 1211, a lens 1212, a lens 1213, a lens 1214, a lens 1215, a lens 1216, a lens 1217, a lens 1218, a parallel plate 1219 equivalent to a three-color separation prism, and a parallel plate 1220 equivalent to a three-color separation prism.

In the relay lens shown in FIG. 12, an optical path length difference caused in a case where the exchange between the bi-splitting prism and the tri-splitting prism is performed is 4.8 mm.

Therefore, in the examples shown in FIG. 12, when the exchange between the bi-splitting prism and the tri-splitting prism is performed, the lens 1203 and the lens 1204 are moved for focusing.

In the video system shown in FIG. 1, a mirror surface is disposed between the lens 1216 and the lens 1217 to bend an optical path of the relay lens by 90°.

Second Example

Figure 13:
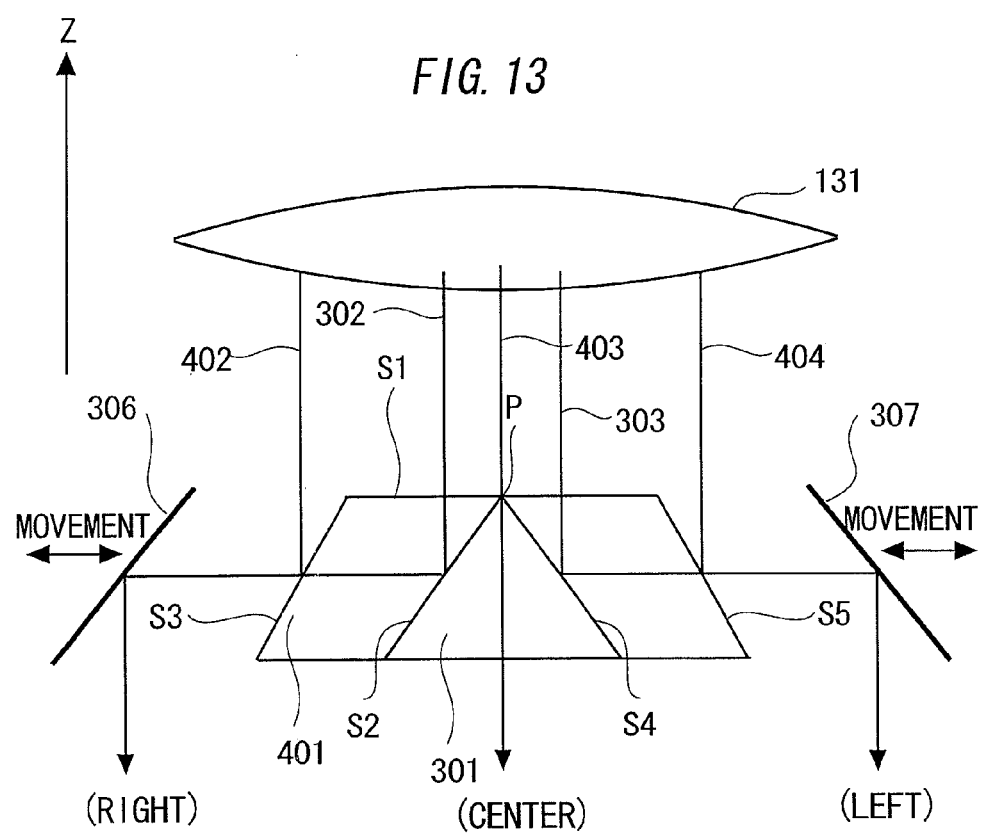
FIG. 13 is a concept view showing a second example of an optical path length adjustment function applied to the video system shown in FIG. 1.

Next, a second example of the optical path length adjustment function applied to the video system shown in FIG. 1 will be described with reference to FIG. 13. FIG. 13 is a concept view showing the second example of the optical path length adjustment function applied to the video system shown in FIG. 1.

As shown in FIG. 13, in the second example of the optical path length adjustment function applied to the video system shown in FIG. 1, the optical path length difference caused in the case where the exchange between the bi-splitting prism and the tri-splitting prism is performed is adjusted by moving the reflecting mirrors 306 and 307.

A mechanism for moving the reflecting mirrors 306 and 307 may be a structure in which a knob, a shaft, a gear, and a moving plate are combined, such as a mechanism similar to the above-mentioned structure shown in FIG. 8.

That is, the reflecting mirrors 306 and 307 are bonded to the moving plate. The moving plate is engaged with the gear. The gear is rotated through the shaft by the rotation of the knob. Then, as shown in FIG. 13, the moving plate is moved leftward and rightward by the rotation of the gear such that optical path lengths of light from the bi-splitting prism and the tri-splitting prism are adjusted to be equal to each other, thereby moving the reflecting mirrors 306 and 307 leftward and rightward.

Third Example

Figure 14:
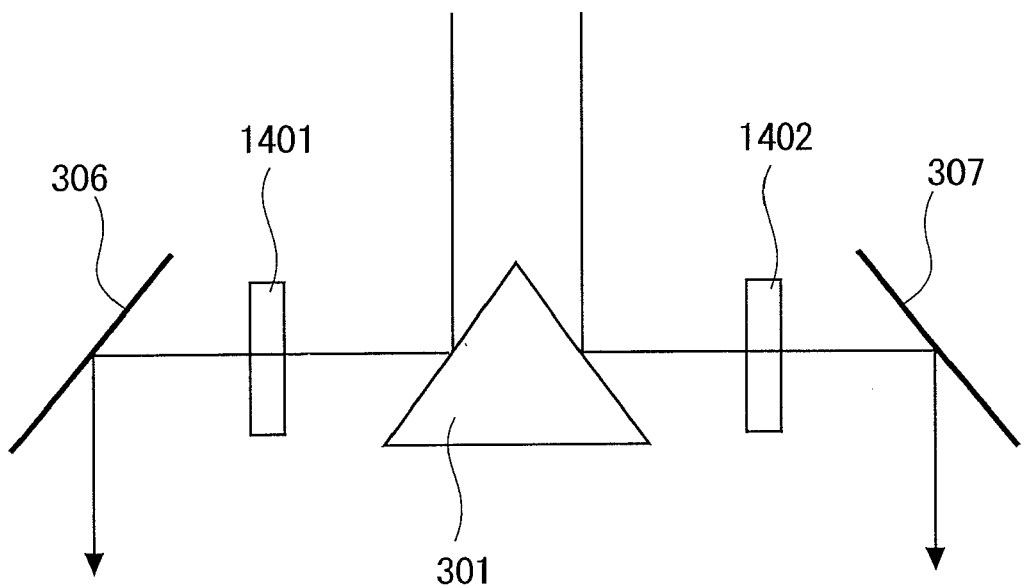
FIG. 14 is a concept view showing a third example of the optical path length adjustment function applied to the video system shown in FIG. 1.
Figure 15:
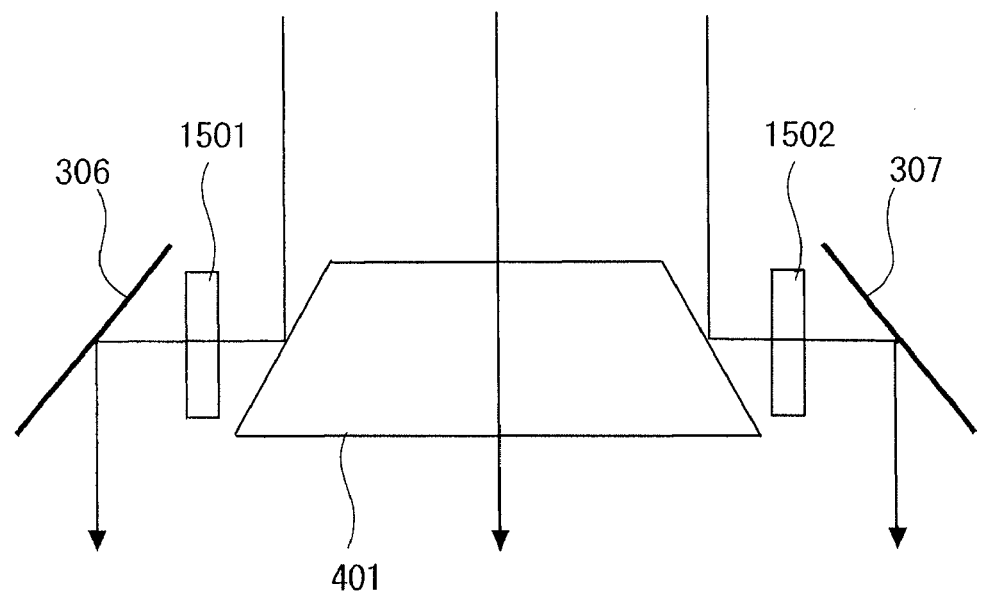
FIG. 15 is a concept view showing the third example of the optical path length adjustment function applied to the video system shown in FIG. 1.

Next, a third example of the optical path length adjustment function applied to the video system shown in FIG. 1 will be described with reference to FIGS. 14 and 15. FIGS. 14 and 15 are a concept view showing the third example of the optical path length adjustment function applied to the video system shown in FIG. 1.

As shown in FIGS. 14 and 15, optical path length adjusting members 1401, 1402, 1501, and 1502 are disposed on corresponding optical paths if necessary.

In this embodiment, when the optical path length adjusting members 1401 and 1402 are disposed on the optical path of the bi-splitting prism 301, the optical path length adjusting members 1501 and 1502 to be disposed on the optical path of the tri-splitting prism 401 are unnecessary in some cases.

In contrast to this, when the optical path length adjusting members 1501 and 1502 are disposed on the optical path of the tri-splitting prism 401, the optical path length adjusting members 1401 and 1402 to be disposed on the optical path of the bi-splitting prism 301 are unnecessary in some cases.

A distance between each of the reflecting mirrors 306 and 307 and the camera is not changed between the case where the bi-splitting prism is used and the case where the tri-splitting prism is used. Therefore, as shown in FIGS. 14 and 15, it is preferable to insert the optical path length adjusting member between the main lens (not shown) and each of the reflecting mirrors 306 and 307.

In the example shown in FIG. 14, the optical path length adjusting members 1401 and 1402 are disposed on the two separate optical paths so that the optical path length of each light split by the bi-splitting prism 301 is made equal to the optical path length of each light split by the tri-splitting prism.

The optical path length adjusting members 1401 and 1402 are made of, for example, glass. However, the material of the optical path length adjusting members 1401 and 1402 is not limited to glass. Refraction indices of the optical path length adjusting members 1401 and 1402 may be different from each other.

In the example shown in FIG. 15, the optical path length adjusting members 150; and 1502 are disposed on the three separate optical paths so that the optical path length of each light split by the tri-splitting prism 401 is made equal to the optical path length of each light split by the bi-splitting prism.

In the example shown in FIG. 15, the optical path length adjusting member is not disposed on a center optical path. This is because the center optical path is used only in a case where a video image is split into three portions or a case where a one-screen video image is captured using one of three divisional video images. Therefore, it is only necessary to optimize the center optical path at the time of three-splitting from the beginning. Thus, it is unnecessary to adjust the optical path length of the center optical path.

The optical path length adjusting members 1501 and 1502 are made of, for example, glass. However, the material of the optical path length adjusting members 1501 and 1502 is not limited to glass. Refraction indices of the optical path length adjusting members 1501 and 1502 may be different from each other.

<Modified Example of Splitting Unit>

In the above-mentioned embodiment, a case where a combination of the bi-splitting prism and the tri-splitting prism is used as a splitting unit for splitting light is described. However, the present invention is not limited to this case and thus various splitting units can be used.

Figure 16:
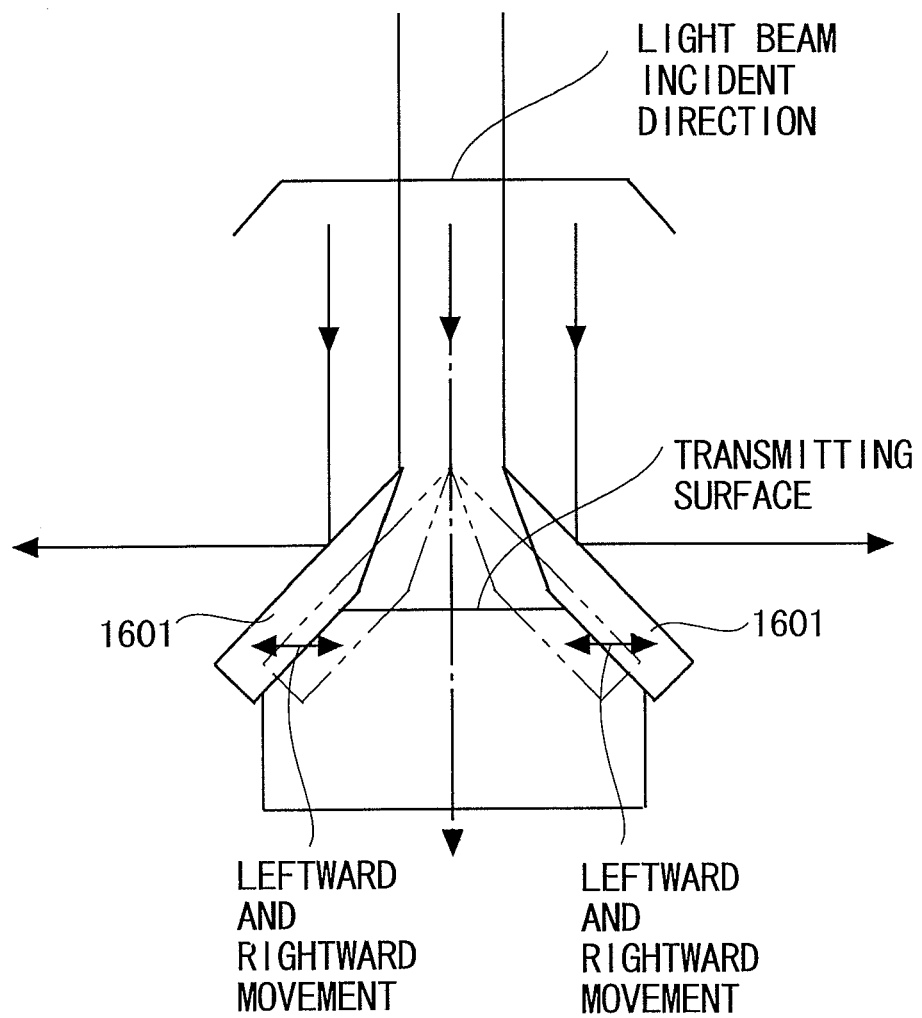
FIG. 16 is a schematic view showing a reflecting mirror type splitting unit which can be used for the video system shown in FIG. 1.

For example, a reflecting mirror type splitting unit as shown in FIG. 16 or a regular triangular prism type splitting unit as shown in FIG. 17 can be used as the splitting unit. FIG. 16 is a schematic view showing the reflecting mirror type splitting unit which can be used for the video system shown in FIG. 1. FIG. 17 is a schematic view showing the regular triangular prism type splitting unit which can be used for the video system shown in FIG. 1.

In the reflecting mirror type shown in FIG. 16, a 1/3-light part from each of both end portions of an object is reflected on each of two reflecting mirrors 1601 located on left and right sides at angles of 45°. Then, the reflected light is guided to the relay lens in the reflecting mirror type shown in FIG. 16. In addition, in the reflecting mirror type shown in FIG. 16, a 1/3-light part from a center portion of a screen travels without any change and is guided to the relay lens.

In the reflecting mirror type, each of the reflecting mirrors 1601 can be moved leftward and rightward. When the reflecting mirrors 1601 are in contact with each other (broken lines), the splitting unit shown in FIG. 16 becomes bi-splitting means. When the reflecting mirrors 1601 are separated from each other (solid lines) as shown in FIG. 16, the splitting unit becomes tri-splitting means.

A mechanism for moving the reflecting mirrors 1601 may be a structure in which a knob, a shaft, a gear, and a moving plate are combined, such as a mechanism similar to the above-mentioned structure shown in FIG. 8.

That is, the respective reflecting mirrors are bonded to the moving plate. The moving plate is engaged with the gear. The gear is rotated through the shaft by the rotation of the knob. The reflecting mirrors are moved leftward and rightward as shown in FIG. 16 by the rotation of the gear, thereby performing the exchange between the bi-splitting means and the tri-splitting means.

In the reflecting mirror type, it is only necessary to coat the reflecting mirrors 1601 with a reflective film. Therefore, unlike the case of a trapezoidal prism, the manufacturing difficulty of a coating interface portion between two kinds of films which are formed in different steps is small.

Next, in the regular triangular prism type shown in FIG. 17, the 1/3-light part from each of both the end portions of the object is reflected by each of two regular triangular prisms 1701 located on left and right sides. In addition, in the regular triangular prism type shown in FIG. 17, the 1/3-light part from the center portion of the screen travels without any change and is guided to the relay lens.

In the regular triangular prism type, each of the regular triangular prisms 1701 can be moved leftward and rightward. When the regular triangular prisms 1701 are in contact with each other (broken lines), the splitting unit shown in FIG. 17 becomes the bi-splitting means. When the regular triangular prisms 1701 are separated from each other (solid lines) as shown in FIG. 17, the splitting unit becomes the tri-splitting means.

A mechanism for moving the regular triangular prisms may be a structure in which a knob, a shaft, a gear, and a moving plate are combined, such as a mechanism similar to the above-mentioned structure shown in FIG. 8.

That is, the respective regular triangular prisms are bonded to the moving plate. The moving plate is engaged with the gear. The gear is rotated through the shaft by the rotation of the knob. The regular triangular prisms are moved leftward and rightward as shown in FIG. 17 by the rotation of the gear, thereby performing the exchange between the bi-splitting means and the tri-splitting means.

The regular triangular prism type uses the total reflection of the regular triangular prisms 1701. Therefore, it is only necessary to coat an incident surface of each of the regular triangular prisms 1701 with an antireflective film. Thus, as in the case of the reflecting mirror type shown in FIG. 16, the manufacturing difficulty of a coating interface portion between different kinds of films is small.

Effect of this Embodiment

As described above, according to the video system using the video system in the embodiment of the present invention, the light incident on the main lens 131 can be split by the bi-splitting prism or the tri-splitting prism of the splitting unit 135. When the reflecting mirror type splitting unit as shown in FIG. 16 or the regular triangular prism type splitting unit as shown in FIG. 17 is used, the light incident on the splitting unit can be split by the reflecting mirrors or the regular triangular prisms.

Therefore, a one-screen video image for which the division is not required, two divisional images, and three divisional images can be captured by the single video system.

That is, in this embodiment, when only a center image of three divisional video image of the object is used, it is adaptable to even in a case where image pickup is performed using only a single camera. Therefore, the video system using the image shooting apparatus according to this embodiment is adaptable to each of a case where images of the object are shot by three cameras, a case where images thereof is shot by two cameras, an image thereof is shot by a single camera. That is, in this embodiment, an image of normal, twice, or three-time wide, which corresponds to a lateral width of a single, two, or three cameras, can be captured, recorded/reproduced, relayed/transmitted, or displayed/screened.

In the video system using the image shooting apparatus according to the embodiment of the present invention, the exchange between the bi-splitting prism and the tri-splitting prism is performed using the exchange mechanism as shown in FIG. 8. Therefore, even when the exchange between the bi-splitting prism and the tri-splitting prism is performed, a positional displacement between the bi-splitting prism and the tri-splitting prism relative to the housing of the lens unit 110 can be reduced.

As shown in FIGS. 12 to 15, the optical path length is adjusted in the video system using the image shooting apparatus according to this embodiment. Therefore, even when the exchange between the bi-splitting prism and the tri-splitting prism is performed, suitable image pickup is possible.

INDUSTRIAL APPLICABILITY

According to the present invention, a video image formed by condensing through only the single main lens can be shot using a single, two, or three cameras which may be combined at the scene.

The invention claimed is:

1. An image shooting apparatus, comprising:
   a bi-splitting device for splitting incident light into two split light portions, which bi-splitting device can be located at a position other than a position where a focal position of a main lens on which light from an object to be image-captured is incident coincides with a focal position of a relay lens which guides the split light portions;
   a tri-splitting device for splitting the incident light into three split light portions, which tri-splitting device can be located at a position other than the position where the focal position of the main lens on which light from the object to be image-captured is incident coincides with the focal position of the relay lens which guides the split light portions;
   the bi-splitting and tri-splitting devices being configured such that all of the incident light that is split into two split light portions by the bi-splitting device is split into three split light portions by the tri-splitting device; and
   an exchange device for exchanging between the bi-splitting device and the tri-splitting device.

2. The image shooting apparatus according to claim 1, wherein the relay lens includes a focus lens group which includes a convex lens group having at least one convex lens and a concave lens group having at least one concave lens,
   wherein at least one of the convex lens group and the concave lens group in the focus lens group is moved to perform an adjustment in which an optical path length of each of the two split light portions is made equal to an optical path length of each of the three split light portions.

3. The image shooting apparatus according to claim 1, further comprising a reflecting device for reflecting light outputted from the bi-splitting device and the tri-splitting device,
   wherein the reflecting device is mechanically moved to perform an adjustment in which an optical path length of each of the two split light portions is made equal to an optical path length of each of the three split light portions.

4. The image shooting apparatus according to claim 1, wherein the image shooting apparatus is connectable to at least one camera, and further comprising an adjusting device for performing an adjustment in which an optical path length of each of the two split light portions is made equal to an optical path length of each of the three split light portions, the adjusting device being inserted on an optical path between the main lens and the camera.

* * * * *

UNITED STATES PATENT AND TRADEMARK OFFICE
CERTIFICATE OF CORRECTION

PATENT NO.        : 7,623,781 B1                                        Page 1 of 1
APPLICATION NO.   : 10/591717
DATED             : November 24, 2009
INVENTOR(S)       : Masayuki Sassa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 477 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,623,781 B1 | Page 1 of 1 |
| APPLICATION NO. | : 10/591717 | |
| DATED | : November 24, 2009 | |
| INVENTOR(S) | : Sassa | |

It is certified that error appears in the above-identified patent and that said Letters Patent is hereby corrected as shown below:

Column 17,

Line 22, "150" should read --1501--.

Signed and Sealed this
Fourth Day of January, 2011

David J. Kappos
*Director of the United States Patent and Trademark Office*